(12) United States Patent
Edwards et al.

(10) Patent No.: US 6,670,916 B2
(45) Date of Patent: Dec. 30, 2003

(54) METHOD AND SYSTEM FOR POSITION CALCULATION FROM CALCULATED TIME

(75) Inventors: Stephen J. Edwards, San Francisco, CA (US); Paul W. McBurney, San Francisco, CA (US)

(73) Assignees: Seiko Epson Corporation, Tokyo (JP); eRide, Inc., San Francisco, CA (US)

( * ) Notice: Subject to any disclaimer, the term of this patent is extended or adjusted under 35 U.S.C. 154(b) by 96 days.

(21) Appl. No.: 10/079,244

(22) Filed: Feb. 19, 2002

(65) Prior Publication Data

US 2003/0156058 A1 Aug. 21, 2003

(51) Int. Cl.[7] .................................................. G01S 5/14
(52) U.S. Cl. ................................................. 342/357.15
(58) Field of Search .......................... 342/357.15, 357.1, 342/357.12

(56) References Cited

U.S. PATENT DOCUMENTS

| 6,191,731 | B1 | * | 2/2001 | McBurney et al. |
| 6,204,808 | B1 | * | 3/2001 | Bloebaum et al. |
| 6,417,801 | B1 | * | 7/2002 | Van Diggelen |
| 2002/0107636 | A1 | * | 8/2002 | Ford et al. |

* cited by examiner

*Primary Examiner*—Gregory C. Issing

(57) ABSTRACT

A navigation-satellite receiver comprises means for initialization that gets a head start by knowing time to within a few seconds and position to within 150 kilometers. A two-dimensional grid of points is setup with constant altitude that represents solution starting points within the 150 kilometer area. Fractional pseudoranges from each satellite in a constellation are inspected for a best initial fit with the points in the grid. A variety of time bias adjustments within the time bounds are also tried against the points to find a best fitting point. That point then is used in a drive to find the final solution and to produce the first fix from cold start.

25 Claims, 2 Drawing Sheets

METHOD AND SYSTEM FOR POSITION CALCULATION FROM CALCULATED TIME

1. FIELD OF THE INVENTION

Figure 1:
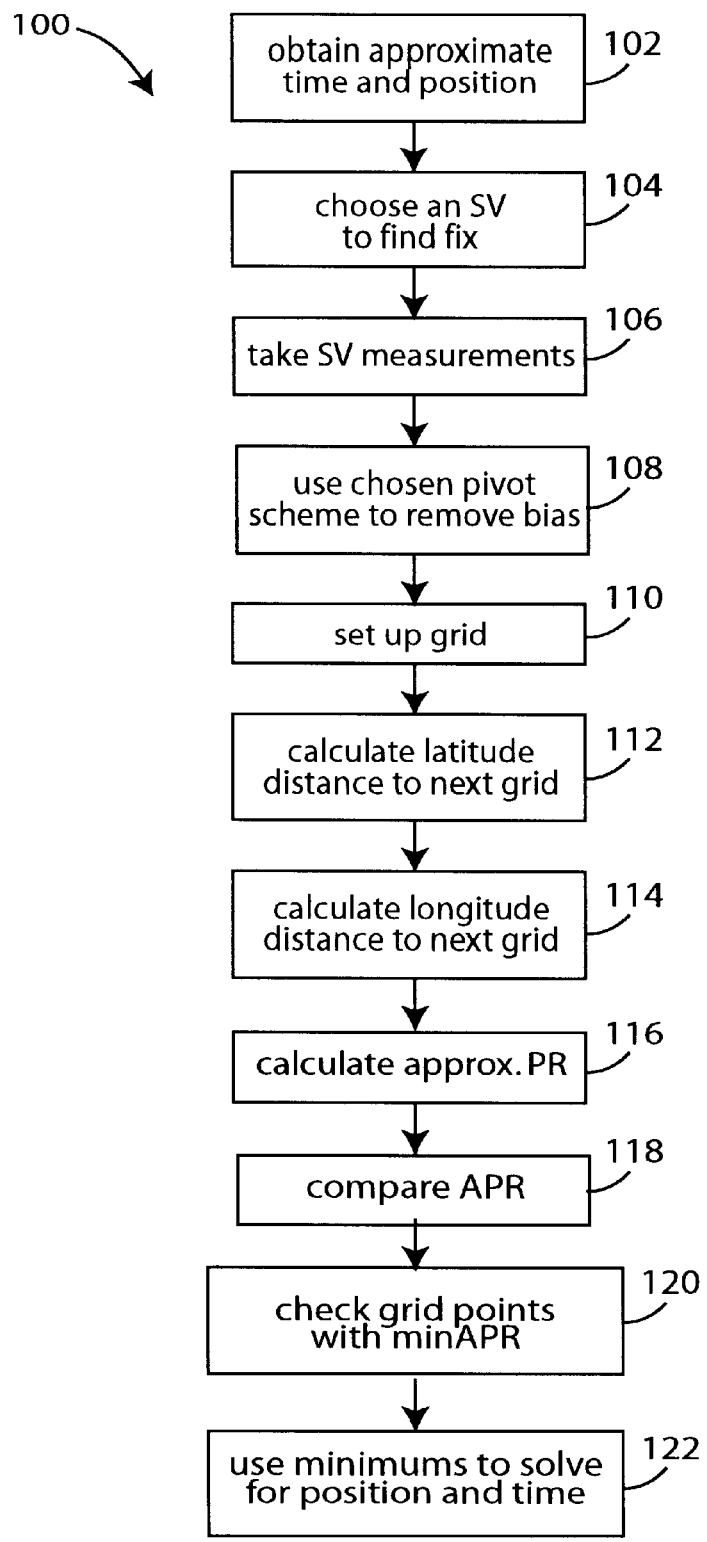

The present invention relates to navigation satellite receivers, and more particularly to methods and systems for aiding the initializing of navigation satellite receivers with limited prior knowledge of time and location.

2. DESCRIPTION OF THE PRIOR ART

Global positioning system (GPS) receivers use signals received from several earth-orbiting satellites to determine user position and velocity, and other navigational data. A navigation receiver that has just been turned on does not yet know where it is, how much its crystal oscillator is in error, nor what time it is. All these are needed to find and lock onto the satellite transmissions, and so a search must be made of all the possibilities.

Because the receiver and satellite clocks are not perfectly synchronized, such clock offset acts as an error on the distance to the satellite. The apparent distance is called the "pseudorange" (PR). The clock error can be computed by assuming all the pseudoranges to the different satellites will have the same clock offset in one measurement epoch. So four satellites are needed for a position fix, three for latitude, longitude and height or (X, Y and Z), and one for the clock offset.

Two different-length modulating codes are transmitted on two microwave carriers. The carrier wavelengths are nineteen and twenty-four centimeters. The precision (P) code is available only to authorized (military) users and does not have any ambiguity because its length is about 181,440,000,000 km, the distance traveled by light in one week. The coarse acquisition (C/A) code is much shorter and repeats every 300 km of radio wave propagation distance, so observations outside a range of 0–300 km can be ambiguous. Since the distance to a satellite is typically 20,000 km, which 300 km segment the receiver is in needs to be determined. This is called an integer ambiguity.

The Z-count is a 29-bit binary number that represents a fundamental GPS time unit. The ten most significant bits carry the GPS week number, and the nineteen least significant bits give the time of week (TOW) count in units of 1.5 seconds. A much finer gauge of the system time is available once the receiver locks onto a few satellites. Prior art devices have depended on determining the z-count during initialization.

Before GPS carrier phase observables can be used for positioning, the integer ambiguities must be resolved. The phase measurement is translated into a distance measurement. Conventional estimation techniques cannot solve the receiver coordinates, the clock offset and the integer ambiguities in one epoch of data, for all the satellites observed. Collecting a few epochs of data doesn't help much. Although there are enough equations, the problem is insoluble, since the satellite's geometry with respect to the receiver is not usually favorable enough. The integer ambiguity values can only be determined after a significant change in the geometry, unless an on-the-fly (OTF) technique is being used.

The two basic types of GPS positioning systems are real-time navigation and high-precision carrier phase positioning. Real-time navigation systems collect a minimum of four pseudorange (PR) measurements to four satellites. The PR measurements are used to solve for the three-dimensional coordinates of the receiver and the clock offset between the receiver oscillator and GPS system time. Differential GPS (DGPS) also collects the pseudorange observables, and further obtains real-time corrections for the errors inherent in the measurements.

Precise carrier-phase observations can be used to compute locations to within a few centimeters. Phase measurements of the short, different wavelengths of the two carriers (19-cm and 24-cm for L1 and L2 respectively), are used to resolve such. The whole number of complete wavelengths between the satellite and receiver, e.g., integer ambiguities, must first be determined. Post processing (static) or Real-Time (RTK) methods are used in the prior art that use linear combinations of the two frequencies and differencing techniques. The pseudorange can be combined with the phase data to reduce the noise error for much higher positioning accuracy.

During initialization, a navigation satellite receiver will search to find signal power from the available satellites. Which satellites are available depends on the respective satellites' ephemeris, the user's position on earth, and the time. A little bit of prior knowledge of any or all of these can be used to abbreviate the time, space, and frequency spectrums that must be searched. The navigation satellite receiver will then be able to produce its first position and velocity solution much quicker.

Mobile GPS receivers can be aided in their initialization by a remote server that can provide time, position, and/or frequency information. Such a prior art scheme is described by Samir Soliman, et al., in U.S. Pat. No. 6,081,229, issued Jun. 27, 2000, and is incorporated herein by reference.

Gilbert Strang, a professor of mathematics at MIT, wrote an article about integer ambiguities in the Society for Industrial and Applied Mathematics (SIAM) News, Volume 30, Number 5, June 1997. He says the receiver must know the count of the number of radio wavelengths between the satellites and the receiver. Such count is an integer number of phase changes plus a fraction of a phase. The integer part is initially unknown and is ambiguous. Its resolution has to be right, because one missing wavelength means an error of 19 cm or 24 cm, depending on whether the L1 or L2 carrier is being measured.

Once the integer is known, it is important to keep track of it. A loss-of-lock caused by losing signal can result in cycle slips. The fractional part is obvious, but the whole number of cycles is hard to discover and takes time. In GPS, there might be dozens of integer ambiguities to determine simultaneously, and is a problem in integer least squares. This is identical to the nearest lattice vector problem in computational combinatorics, e.g., minimize $(x-x_0)^T A(x-x_0)$ for x in $Z^n$. The minimum over $R^n$ is clearly zero, at $x=x_0$. The lattice point x, the ambiguity vector, is closest to $x_0$ in the metric of A. Such minimization over $Z^n$ is such a difficult problem for large random matrices A, that its solution has been used by cryptographers to encode messages.

In GPS, the weighting matrix A sometimes involves distances between receivers, and the problem is hardest for a global network. The minimization is easy when A is diagonal, because the variables are uncoupled. Each component of x will be the nearest integer to the corresponding component of $x_0$. But an ill-conditioned A severely stretches the lattice. A direct search for the best x becomes horrible. The natural idea is to precondition A by diagonalizing as nearly as possible, always keeping the change of basis matrices Z and $Z^{-1}$ integral. Then $y^T(Z^T A Z)y$ will be more nearly uncoupled than $x^T A x$, and $y=Z^{-1}x$ will be integral exactly when x is.

SUMMARY OF THE INVENTION

It is therefore an object of the present invention to provide a method and system for navigation satellite reception and receiver initialization that can proceed without an initial Z-count.

It is another object of the present invention to provide a method and system for shortening the time needed for initialization of navigation devices.

It is a further object of the present invention to provide a satellite-navigation system that is inexpensive.

Briefly, a navigation-satellite receiver embodiment of the present invention comprises means for initialization that gets a head start by knowing time to within a few seconds and position to within 150 kilometers. A two-dimensional grid of points is setup with constant altitude that represents solution starting points within the 150 kilometer area. Fractional pseudoranges from each satellite in a constellation are inspected for a best initial fit with the points in the grid. A variety of time bias adjustments within the time bounds are also tried against the points to find a best fitting point. That point then is used to find the final solution and to produce the first fix from cold start.

An advantage of the present invention is that a system and method are provided that produce faster initialization times in navigation satellite receivers.

Another advantage of the present invention is that a system and method are provided for making simple and inexpensive navigation satellite receivers.

These and other objects and advantages of the present invention will no doubt become obvious to those of ordinary skill in the art after having read the following detailed description of the preferred embodiments which are illustrated in the various drawing figures.

IN THE DRAWINGS

Figure 2:
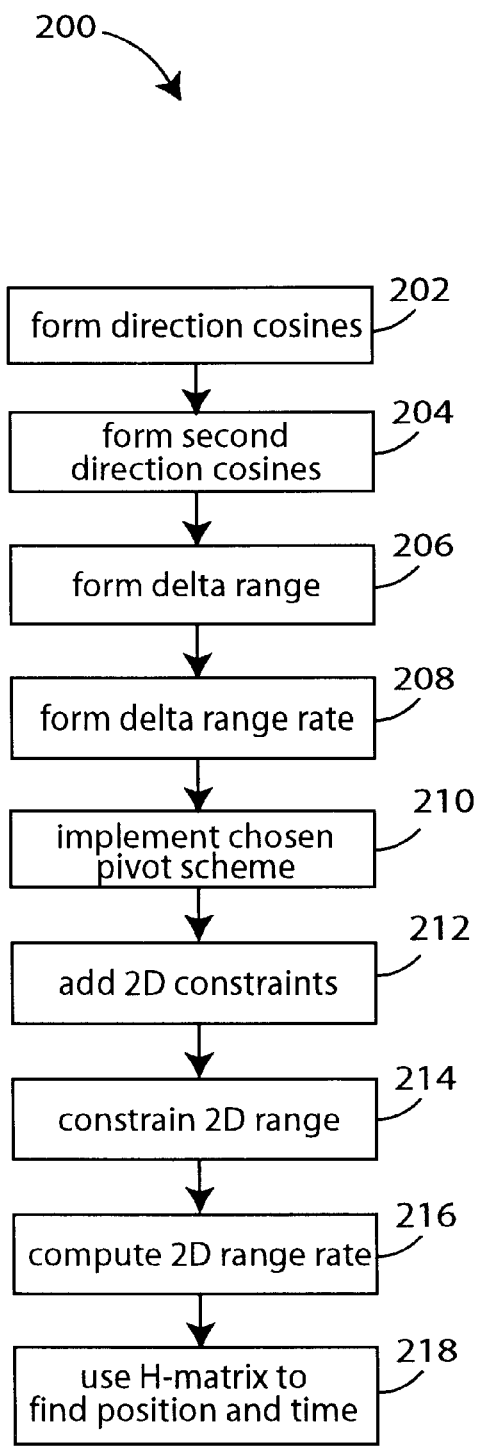

FIG. 1 is a flowchart diagram of a first method embodiment of the present invention for initializing a satellite navigation receiver; and FIG. 2 is a flowchart diagram of a second method embodiment of the present invention for initializing a satellite navigation receiver.

DETAILED DESCRIPTION OF THE PREFERRED EMBODIMENT

In general, a navigation-satellite receiver embodiment of the present invention comprises means for initialization that gets a head start by knowing time to within a few seconds and position to within 150 kilometers. A two-dimensional grid of points is setup with constant altitude that represents solution starting points within the 150 kilometer area. Fractional pseudoranges from each satellite in a constellation are inspected for a best initial fit with the points in the grid. A variety of time bias adjustments within the time bounds are also tried against the points to find a best fitting point. That point then is used in a drive to find the final solution and to produce the first fix from cold start.

In FIG. 1, a first method embodiment of the present invention for initializing a GPS receiver begins by assuming time is correctly known to within a few seconds, and the user's position is correctly known to within 150 kilometers from the true position. A method 100 begins with a step 102 in which approximate time and position are known, e.g., from data obtained from a third party or some local record keeping. In a step 104, a GPS satellite vehicle (SV) is chosen that will be used in the fix. The selection depends on whether a satellite position-velocity (SPV) model is available, as well as a correction model. In a step 106, measurements from the chosen SV are taken and propagated to the fix time. Corrections to the initial position and time are calculated. Such corrections get removed from the propagated measurements ("fracRange"). In a step 108, the common mode bias is removed using a pivot scheme, e.g., (a) choosing a single SV to remove from the others, (b) removing an average of all SV's from each equation, or (c) a combination of these.

A constant-altitude grid is setup in a step 110. The initial position is transformed from an earth-centered, earth-fixed (ECEF) to a longitude-latitude (LLA) type. In a step 112, how large a change in latitude would be needed to move north to the next grid is calculated. In a step 114, a similar calculation is made for how large a change in longitude would be needed to move east to the next grid. In a step 116, starting at a south-west corner, the a priori residual (APR) is calculated. The predicted range at the current grid location is calculated by, $$\Phi_{c,i} = \sqrt{\Sigma(\vec{x}_{s,i} - \vec{x}_u)^2}.$$

The double difference is formed, $$d\text{diff}=(\text{fracRange}_i-\text{fracRange}_{pivot})-(\Phi_{c,i}-\Phi_{c,pivot}).$$

Such double difference is then limited to $\pm C\_m\sec/2$. Then, $APR=\Sigma d\text{diff}^2$. In a step 118, the APR is compared with a minimum APR (minAPR1), and if it is lower it is used to replace a variable "minAPR1".

In a step 120, a check is made to see if there is at least one grid point between the current value and minAPR1, if so the minAPR2 is replaced with minAPR1. If the current value is greater than the minAPR1, and is less than minAPR2, a check sees if it is more than one grid point away from minAPR1. If so minAPR2 is replaced with the current value.

In a step 122, once two minimums have been found that are not at adjacent grid points, these minimums are used to solve for position and time. Linearizing the range equations around position and time, $$\begin{bmatrix} -(U_{x,1}-U_{x,piv}) & -(U_{y,1}-U_{y,piv}) & -(U_{z,1}-U_{z,piv}) & (U_1 \cdot v_{s,1}-U_{piv}\cdot v_{s,piv}) \\ -(U_{x,2}-U_{x,piv}) & -(U_{y,2}-U_{y,piv}) & -(U_{z,2}-U_{z,piv}) & (U_2 \cdot v_{s,2}-U_{piv}\cdot v_{s,piv}) \\ \vdots & \vdots & \vdots & \vdots \\ -(U_{x,i}-U_{x,piv}) & -(U_{y,i}-U_{y,piv}) & -(U_{z,i}-U_{z,piv}) & (U_i \cdot v_{s,i}-U_{piv}\cdot v_{s,piv}) \end{bmatrix} \begin{Bmatrix} \Delta x \\ \Delta y \\ \Delta z \\ \Delta t \end{Bmatrix} =$$

$$\begin{Bmatrix} ddiff_1 \\ ddiff_2 \\ \vdots \\ ddiff_i \end{Bmatrix}.$$

The result is measurement minus predicted. The delta pseudorange is limited to plus-or-minus one-half millisecond. If the time error is ignored, the result is the equivalent to the outdoor fix disregarding an integer millisecond value. This system is solved using an inverse method, maintaining a close eye on the values of the deltas. If the deltas or the user positions exceed expected bounds, the other minimum is used instead. For solution integrity, the sub-solutions are all initially solved without allowing time to change. This allows any spurious measurements that are found to be culled.

Therefore, iterating the last equation until deltas x, y, z, and t, are all zero will produce the four-dimensional solution, x-y-z and time. The final solution is forced to be within one grid step size.

FIG. 2 represents a second method embodiment of the present invention, and is referred to herein by the general reference numeral 200. In a step 202, the direction cosines are formed, e.g., $$\hat{R} = \sqrt{(x_s - x_u)^2 + (y_s - y_u)^2 + (z_s - z_u)^2}$$

$$U_x = \frac{(x_s - x_u)}{\hat{R}}$$

$$U_y = \frac{(y_s - y_u)}{\hat{R}}$$

$$U_z = \frac{(z_s - z_u)}{\hat{R}}.$$

A step 204 forms second direction cosines, e.g., $$R\hat{\dot{R}}_i = U \cdot (v_s - v_u)$$

$$S_x = \frac{\partial(R\dot{R})}{\partial(x_s)}$$

$$= \frac{U_x^2(u_s - u_u) + U_x U_y(v_s - v_u) + U_x U_z(w_s - w_u)}{\hat{R}} - \frac{(u_s - u_u)}{\hat{R}}$$

$$= \frac{[R\hat{\dot{R}} * U_x - (u_s - u_u)]}{\hat{R}}$$

$$S_y = \frac{[R\dot{R} * U_y - (v_s - v_u)]}{R}$$

$$S_z = \frac{[R\dot{R} * U_z - (w_s - w_u)]}{R}.$$

A step 206 forms a delta-range equation, $$\Delta Int_i C_{m\,sec} + (\Phi_i - \Phi_{piv}) - (corr_i - corr_{piv}) - (R_i - R_{piv}) = -(U_i - U_{piv}) \cdot \Delta \vec{x} + (U_i \vec{v}_i - U_{piv} \vec{v}_{piv}) \Delta t$$

A step 208 forms delta range rate (DRR) equation, $$(RR_i - RR_{piv}) - (R\hat{\dot{R}}_i - R\hat{\dot{R}}_{piv}) = (S_i - S_{piv}) \cdot \Delta x_u - (S_i v_{s,i} - S_{piv} v_{s,piv}) \Delta t - (U_i - U_{piv}) \cdot \Delta v_u + (U_i a_{s,i} - U_{piv} a_{s,piv}) \Delta t$$

A pivot scheme is implemented in a step 210. A step 212 adds two-dimension constraints, $$\tilde{U}_{x,2D} = \frac{BoAx}{\sqrt{BoAx^2 + BoAy^2 + AoBz^2}}$$

$$\tilde{U}_{y,2D} = \frac{BoAy}{\sqrt{BoAx^2 + BoAy^2 + AoBz^2}}$$

$$\tilde{U}_{z,2D} = \frac{BoAz}{\sqrt{BoAx^2 + BoAy^2 + AoBz^2}}$$

$$linRange_{2D} = \sqrt{BA} + alt_{fix} - \sqrt{BoAx^2 + BoAy^2 + AoBz^2}.$$

A step 214 makes the two-dimension (2D) range constraint, $$\tilde{U}_{x,2D}\Delta x_u + \tilde{U}_{y,2D}\Delta y_u + \tilde{U}_{z,2D}\Delta z_u = \sqrt{BA} + alt_{fix} - \sqrt{BoAx^2 + BoAy^2 + AoBz^2}.$$

A step 216 computes the two-dimension range rate equation, $$\tilde{U}_{x,2D}\Delta u_u + \tilde{U}_{y,2D}\Delta v_u + \tilde{U}_{z,2D}\Delta w_u = 0;$$

Where

A is the major earth axis=6,378,137.0 meters;

B is the minor earth axis=6,356,752.3141 meters;

BoA=B/A=0.996647189;

AoB=A/B=1.003364090;

"Alt" is the altitude of the current user's position; and

"Altfix" is the chosen altitude of the two-dimension fix.

Such two-dimension constraint gets attached to the bottom of $\hat{H}$ with the same sign convention as the other direction cosines.

There are seven unknowns that are not associated with individual SV's, namely, x, y, z, u, v, w, and t. Each SV there is associated with an unknown $\Delta Int_i$, the integer millisecond ambiguity between the $i^{th}$ satellite and the pivot satellite. For each SV, except the pivot satellite, there are two equations.

For six SV's, there are their associated ten equations and five unknowns, and two two-dimension constraints. This results in a determined system of twelve equations and twelve unknowns.

A step 218 uses an H-Matrix. All the unknowns are put on the left side to form the H matrix, $$\begin{bmatrix} -C_{m\sec} & -(U_i - U_{piv}) & 0 & (U_i \cdot v_{s,i} - U_{piv} \cdot v_{s,piv}) \\ \vdots & \vdots & \vdots & \vdots \\ 0 & (S_i - S_{piv}) & -(U_i - U_{piv}) & \{-(S_i \cdot v_{s,i} - S_{piv} \cdot v_{s,piv}) + (U_i \cdot a_{s,i} - U_{piv} \cdot a_{s,piv})\} \\ \vdots & \vdots & \vdots & \vdots \\ 0 & \tilde{U}_{2D} & 0 & 0 \\ 0 & 0 & \tilde{U}_{2D} & 0 \end{bmatrix};$$

Leaving a right hand side, $$RHS = \begin{Bmatrix} (\Phi_i - \Phi_{piv}) - (corr_i - corr_{piv}) - (\hat{R}_i - \hat{R}_{piv}) \\ \vdots \\ (RR_i - RR_{piv}) - (R\hat{R}_i - R\hat{R}_{piv}) \\ \vdots \\ \sqrt{BA} + alt_{fix} - \sqrt{BoAx^2 + BoAy^2 + AoBz^2} \\ 0 \end{Bmatrix};$$

Thus must be solved, $$H \begin{Bmatrix} \Delta Int \\ \Delta x \\ \Delta v \\ \Delta g \end{Bmatrix};$$

Where $\Delta Int_i$ is forced to be an integer.

This is solved in a step 220 using the matrix inverse. However, rather than use the inverse directly on H, it is used on $H^t H$ and RHS pre-multiplied by $H^t$, $$\Delta = (H^t H)^{-1} H^t RHS.$$

This is preferred because the trace of $H^t H^{-1}$ is the dilution of precision (dop) squared (dops$^2$), and indicates how sensitive each variable is to noise.

Embodiments of the present invention use fractional pseudoranges to find solutions. Artisans will understand that the full integer millisecond is not initially available because there is no means to compute it without bit transition time (BTT) or the Z-count, and so the full pseudorange is unknown.

In general, a grid of points is generated to mandate that computations start within a half millisecond of the true point, then a fractional RHS is used to drive the solution to an answer.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A navigation satellite receiver method, the method comprising the steps of:

not using z-count and assuming time is known to within a few seconds;

assuming position is known to within a few hundred kilometers;

creating an imaginary grid of points that could lie within the uncertainties of said time and position assumptions; and using partial pseudoranges, without knowing the solution to the integer ambiguity problem, to find particular points in said grid of points that fit best with regard to said time and position assumptions;

wherein, a best-fitting point is used iteratively to find a final solution and to produce a first fix from cold start.

2. The method of claim 1, the method further comprising the steps of:

obtaining approximate time and position from data obtained from a third party or some local record keeping.

3. The method of claim 1, the method further comprising the steps of:

choosing a satellite vehicle (SV) for use in finding a fix;

wherein an SV selection depends on whether a satellite position-velocity (SPV) model is available, as well as a current corrections model.

4. The method of claim 1, the method further comprising the steps of:

taking measurements from a chosen satellite vehicle (SV);

propagating said measurements to a fix time; and calculating corrections to an initial position and time.

5. The method of claim 1, the method further comprising the steps of:

removing common mode bias with a divot scheme.

6. The method of claim 1, the method further comprising the steps of:

generating a constant-altitude grid wherein an initial position is transformed from an earth-centered, earth-fixed (ECEF) to a longitude-latitude (LLA) type.

7. The method of claim 6, the method further comprising the steps of:

calculating how large a change in latitude would be needed to move north to a next step in the grid.

8. The method of claim 7, the method further comprising the steps of:

calculating how large a change in longitude would be needed to move east to a next step in the grid.

9. The method of claim 8, the method further comprising the steps of:

calculating an a priori residual (APR), wherein the predicted range at the current grid location can be described by, $$\Phi_{c,i} = \sqrt{\sum (\vec{x}_{s,i} - \vec{x})^2}.$$

10. The method of claim 9, the method further comprising the steps of:

calculating a double difference, as in, ddiff=(fracRange$_i$-fracRange$_{pivot}$)-($\Phi_{c,i}$-$\Phi_{c,pivot}$);

wherein, such double difference is then limited to ±C__m sec/2, and, APR=Σddiff$^2$.

11. The method of claim 10, the method further comprising the steps of:

comparing the APR with a minimum APR (minAPR1), and if it is lower using it to replace a variable "minAPR1"; and checking if there is at least one grid point between a current value and minAPR1, and if so for replacing minAPR2 with minAPR1, and if said current value is greater than minAPR1, and is less than minAPR2, a for checking if it is more than one grid point away from minAPR1, and if so replacing minAPR2 with said current value.

12. The method of claim 11, the method further comprising the steps of:

linearizing the range equations around position and time, $$\begin{bmatrix} -(U_{x,1}-U_{x,piv}) & -(U_{y,1}-U_{y,piv}) & -(U_{z,1}-U_{z,piv}) & (U_1 \cdot v_{s,1}-U_{piv} \cdot v_{s,piv}) \\ -(U_{x,2}-U_{x,piv}) & -(U_{y,2}-U_{y,piv}) & -(U_{z,2}-U_{z,piv}) & (U_2 \cdot v_{s,2}-U_{piv} \cdot v_{s,piv}) \\ \vdots & \vdots & \vdots & \vdots \\ -(U_{x,i}-U_{x,piv}) & -(U_{y,i}-U_{y,piv}) & -(U_{z,i}-U_{z,piv}) & (U_i \cdot v_{s,i}-U_{piv} \cdot v_{s,piv}) \end{bmatrix} \begin{Bmatrix} \Delta x \\ \Delta y \\ \Delta z \\ \Delta t \end{Bmatrix} =$$

$$\begin{Bmatrix} ddiff_1 \\ ddiff_2 \\ \vdots \\ ddiff_i \end{Bmatrix} ; \text{ and}$$

iterating such until deltas x, y, z, and t are driven to zero; wherein position and time are solved for a user.

13. The method of claim 12, the method further comprising the steps of:

adding two-dimension constraints, as can be described by, $$\tilde{U}_{x,2D} = \frac{BoAx}{\sqrt{BoAx^2+BoAy^2+AoBz^2}}$$

$$\tilde{U}_{y,2D} = \frac{BoAy}{\sqrt{BoAx^2+BoAy^2+AoBz^2}}$$

$$\tilde{U}_{z,2D} = \frac{BoAz}{\sqrt{BoAx^2+BoAy^2+AoBz^2}}$$

$$linRange_{2D} = \sqrt{BA} + alt_{fix} - \sqrt{BoAx^2+BoAy^2+AoBz^2}.$$

14. The method of claim 13, the method further comprising the steps of:

adding two-dimension range constraints, as can be described by, $\tilde{U}_{x,2D}\Delta x_u + \tilde{U}_{y,2D}\Delta y_u + \tilde{U}_{z,2D}\Delta z_u = BA + alt_{fix} - \sqrt{BoAx^2+BoAy^2+AoBz^2}.$ 15. The method of claim 11, the method further comprising the steps of:

choosing a pivot satellite with a smallest U·v$_s$ term in a group of visible satellites.

16. The method of claim 15, the method further comprising the steps of:

forming a set of direction cosines, as can be described by, $$\hat{R} = \sqrt{(x_s-x_u)^2+(y_s-y_u)^2+(z_s-z_u)^2}$$

$$U_x = \frac{(x_s-x_u)}{\hat{R}}$$

$$U_y = \frac{(y_s-y_u)}{\hat{R}}$$

$$U_z = \frac{(z_s-z_u)}{\hat{R}}.$$

17. The method of claim 16, the method further comprising the steps of:

forming a set of second direction cosines, as can be described by, $$R\dot{\hat{R}}_i = U \cdot (v_s - v_u)$$

-continued $$S_x = \frac{\partial(R\dot{\hat{R}})}{\partial(x_s)}$$

$$= \frac{U_x^2(u_s-u_u)+U_xU_y(v_s-v_u)+U_xU_z(w_s-w_u)}{\hat{R}} - \frac{(u_s-u_u)}{\hat{R}}$$

$$= \frac{[R\dot{\hat{R}}*U_x-(u_s-u_u)]}{\hat{R}}$$

$$S_y = \frac{[RR*U_y-(v_s-v_u)]}{R}.$$

$$S_z = \frac{[RR*U_z-(w_s-w_u)]}{R}.$$

18. The method of claim 17, the method further comprising the steps of:

forming a set of delta-ranges, as can be described by,

ΔInt$_i$C$_m$ $_{sec}$+($\Phi_i$-$\Phi_{piv}$)-(corr$_i$-corr$_{piv}$)-($R_i$-$R_{piv}$)=-($U_i$-$U_{piv}$)·$\vec{\Delta x}$+($U_i$·$\vec{v}_i$-$U_{piv}$·$\vec{v}_{piv}$)Δt.

19. The method of claim 18, the method further comprising the steps of:

forming a set of delta range rates, as can be described by, ($RR_i$-$RR_{piv}$)-($R\dot{\hat{R}}_i$-$R\dot{\hat{R}}_{piv}$)=($S_i$-$S_{piv}$)·Δx$_u$-($S_i$·v$_{s,i}$-$S_{piv}$·v$_{s,piv}$)Δt-($U_i$-$U_{piv}$)·Δv$_u$+($U_i$·a$_{s,i}$-$U_{piv}$·a$_{s,piv}$)Δt.

20. The method of claim 19, the method further comprising the steps of:

adding two-dimension constraints, as can be described by, $$\tilde{U}_{x,2D} = \frac{BoAx}{\sqrt{BoAx^2 + BoAy^2 + AoBz^2}}$$

$$\tilde{U}_{y,2D} = \frac{BoAy}{\sqrt{BoAx^2 + BoAy^2 + AoBz^2}}$$

$$\tilde{U}_{z,2D} = \frac{BoAz}{\sqrt{BoAx^2 + BoAy^2 + AoBz^2}}$$

$$linRange_{2D} = \sqrt{BA} + alt_{fix} - \sqrt{BoAx^2 + BoAy^2 + AoBz^2}.$$

21. The method of claim 20, the method further comprising the steps of:

adding two-dimension range constraints, as can be described by, $$\tilde{U}_{x,2D}\Delta x_u + \tilde{U}_{y,2D}\Delta y_u + \tilde{U}_{z,2D}\Delta z_u = BA + alt_{fix} - \sqrt{BoAx^2 + BoAy^2 + AoBz^2}.$$

22. The method of claim 21, the method further comprising the steps of:

solving a two-dimension range rate equation, as can be described by, $$\tilde{U}_{x,2D}\Delta u_u + \tilde{U}_{y,2D}\Delta v_u + \tilde{U}_{z,2D}\Delta w_u = 0;$$
where A is the major earth axis=6,378,137.0 meters;
B is the minor earth axis=6,356,752.3141 meters;
BoA=B/A=0.996647189;
AoB=A/B=1.003364090;
"Alt" is the altitude of the current user's position; and
"Altfix" is the chosen altitude of the two-dimension fix;

and wherein such two-dimension constraint gets attached to the bottom of $\tilde{H}$ with the same sign convention as the other direction cosines.

23. The method of claim 22, wherein there are seven unknowns that are not associated with individual SV's, namely, x, y, z, u, v, w, and t; and for each SV there is associated with unknown $\Delta Int_i$, an integer millisecond ambiguity between the $i^{th}$ satellite and the pivot satellite; and for each SV, except said pivot satellite, there are solutions to two equations, so for six SV's, there are their associated ten equations and five unknowns, and two two-dimension constraints, resulting in a determined system of twelve equations and twelve unknowns.

24. The method of claim 22, the method further comprising the steps of:

solving for time and position of a user, as can be described by an H-Matrix having a left side, $$\begin{bmatrix} -C_{msec} & -(U_i - U_{piv}) & 0 & (U_i \cdot v_{s,i} - U_{piv} \cdot v_{s,piv}) \\ \vdots & \vdots & \vdots & \vdots \\ 0 & (S_i - S_{piv}) & -(U_i - U_{piv}) & \{-(S_i \cdot v_{s,i} - S_{piv} \cdot v_{s,piv}) + (U_i \cdot a_{s,i} - U_{piv} \cdot a_{s,piv})\} \\ \vdots & \vdots & \vdots & \vdots \\ 0 & \tilde{U}_{2D} & 0 & 0 \\ 0 & 0 & \tilde{U}_{2D} & 0 \end{bmatrix};$$

and a right hand side, $$RHS = \begin{Bmatrix} (\Phi_i - \Phi_{piv}) - (corr_i - corr_{piv}) - (\hat{R}_i - \hat{R}_{piv}) \\ \vdots \\ (R\dot{R}_i - RR_{piv}) - (R\hat{R}_i - R\hat{R}_{piv}) \\ \vdots \\ \sqrt{BA} + alt_{fix} - \sqrt{BoAx^2 + BoAy^2 + AoBz^2} \\ 0 \end{Bmatrix};$$

and for solving for, $$H\begin{Bmatrix} \Delta Int \\ \Delta x \\ \Delta v \\ \Delta g \end{Bmatrix};$$

Where $\Delta Int_i$ is forced to be an integer.

25. The method of claim 24, the method further comprising the steps of:

solving using the matrix inverse indirectly on $H^tH$ and wherein RHS is pre-multiplied by $H^t$, for $\Delta = (H^tH)^{-1} H^tRHS$.

* * * * *

UNITED STATES PATENT AND TRADEMARK OFFICE
CERTIFICATE OF CORRECTION

PATENT NO. : 6,670,916 B2
DATED : December 30, 2003
INVENTOR(S) : Stephen J. Edwards et al.

It is certified that error appears in the above-identified patent and that said Letters Patent is hereby corrected as shown below:

Column 8,
Line 41, please change "divot" to -- pivot --

Line 64, please change " $\Phi_{c,i} = \sqrt{\Sigma(\vec{x}_{s,i} - \vec{x})^2}$ ." to -- $\Phi_{c,i} = \sqrt{\Sigma(\vec{x}_{s,i} - \vec{x}_u)^2}$ .--

Column 9
Line 60, please change

" $\tilde{U}_{x,2D}\Delta x_u + \tilde{U}_{y,2D}\Delta y_u + \tilde{U}_{z,2D}\Delta z_u = BA + alt_{fix} - \sqrt{BoAx^2 + BoAy^2 + AoBz^2}$ ." to -- $\tilde{U}_{x,2D}\Delta x_u + \tilde{U}_{y,2D}\Delta y_u + \tilde{U}_{z,2D}\Delta z_u = \sqrt{BA} + alt_{fix} - \sqrt{BoAx^2 + BoAy^2 + AoBz^2}$ .-- and Column 11,
Line 20, please change " $\tilde{U}_{x,2D}\Delta x_u + \tilde{U}_{y,2D}\Delta y_u + \tilde{U}_{z,2D}\Delta z_u = BA + alt_{fix} - \sqrt{BoAx^2 + BoAy^2 + AoBz^2}$ ." to -- $\tilde{U}_{x,2D}\Delta x_u + \tilde{U}_{y,2D}\Delta y_u + \tilde{U}_{z,2D}\Delta z_u = \sqrt{BA} + alt_{fix} - \sqrt{BoAx^2 + BoAy^2 + AoBz^2}$ .--

Signed and Sealed this

Twentieth Day of July, 2004

JON W. DUDAS
*Acting Director of the United States Patent and Trademark Office*